US012206604B2

(12) United States Patent
Pedersen et al.

(10) Patent No.: US 12,206,604 B2
(45) Date of Patent: Jan. 21, 2025

(54) CROSS-CHANNEL MEASUREMENT CONTROL AND CONFIGURATION

(71) Applicant: Nokia Technologies Oy, Espoo (FI)

(72) Inventors: Klaus Ingemann Pedersen, Aalborg (DK); Benny Vejlgaard, Gistrup (DK); Ali Esswie, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 417 days.

(21) Appl. No.: 17/638,030

(22) PCT Filed: Aug. 26, 2019

(86) PCT No.: PCT/EP2019/072676
§ 371 (c)(1),
(2) Date: Feb. 24, 2022

(87) PCT Pub. No.: WO2021/037333
PCT Pub. Date: Mar. 4, 2021

(65) Prior Publication Data
US 2022/0278788 A1 Sep. 1, 2022

(51) Int. Cl.
*H04L 5/00* (2006.01)

(52) U.S. Cl.
CPC ............ *H04L 5/0035* (2013.01); *H04L 5/005* (2013.01); *H04L 5/0073* (2013.01)

(58) Field of Classification Search
CPC ..... H04L 5/0035; H04L 5/005; H04L 5/0073; H04B 17/345
See application file for complete search history.

(56) References Cited

U.S. PATENT DOCUMENTS

2018/0368204 A1   12/2018 Park et al.
2019/0150011 A1   5/2019 Shoji et al.
(Continued)

FOREIGN PATENT DOCUMENTS

WO   2019/101034 A1   5/2019
WO   2021037333 A1    3/2021

OTHER PUBLICATIONS

"Network Coordination Mechanisms for CLI"; 3GPP TSG RAN WG1 Ad-Hoc Meeting 1901; R1-1900449; Taipei Taiwan, Jan. 21-25, 2019; 3 pgs.

(Continued)

*Primary Examiner* — Yaotang Wang
(74) *Attorney, Agent, or Firm* — Lippes Mathias LLP

(57) ABSTRACT

The present invention introduces a method and a system for base station cross-channel measurement control and configuration. A centralized unit (CU) (301, 601) of a base station configures (304, 305) at least two distributed units (DU) (302, 303, 602, 604) with DU sounding signaling transmission objects and DU cross-link measurement objects. The first DU (302) transmits (306) a sounding signal through an air interface (308) which the second DU (303) measures (307). The second DU (303) reports (309) this to the CU (301). Then the second DU (303) transmits (311) a sounding signal through an air interface (312) which the first DU (302) measures (310). The first DU (302) reports (313) this to the CU (301). Beam-forming can be applied as well. Also neighboring operators can be found by inter-frequency measurements of the sounding signals or Synchronization Signals. The CU (301, 601) can control the DUs (302, 303, 602, 604) with appropriate TDD switching patterns based on the found cross-link interference levels.

17 Claims, 9 Drawing Sheets

(56) References Cited

U.S. PATENT DOCUMENTS

| | | | |
|---|---|---|---|
| 2019/0373602 A1* | 12/2019 | Qin | H04B 7/0404 |
| 2020/0053661 A1* | 2/2020 | Yang | H04W 52/146 |
| 2021/0152261 A1* | 5/2021 | Kang | H04B 17/336 |
| 2022/0069928 A1* | 3/2022 | Hwang | H04B 17/318 |

OTHER PUBLICATIONS

"Interference measurement table for beam coordination"; 3GPP TSG-RAN WG1 Meeting#89; R1-1709041; Hangzhou, China; May 15-19, 2017; 6 pgs.

"Overview on RAN2 aspects of CLI"; 3GPP TSG-RAN WG2 #106; R2-1907334; Reno, Nevada; May 13-17, 2019; 5 pgs.

"3rd Generation Partnership Project; Technical Specification Group Radio Access Network; NG-RAN; Architecture description (Release 15)", 3GPP TS 38.401, V15.1.0, Mar. 2018, pp. 1-23.

"3rd Generation Partnership Project; Technical Specification Group Radio Access Network; NG-RAN; Xn application protocol (XnAP) (Release 15)", 3GPP TS 38.423, V15.3.0, Mar. 2019, pp. 1-294.

"3rd Generation Partnership Project; Technical Specification Group Radio Access Network; NG-RAN; E1 general aspects and principles (Release 15)", 3GPP TS 38.460, V15.3.0, Mar. 2019, pp. 1-10.

"3rd Generation Partnership Project; Technical Specification Group Radio Access Network; NG-RAN; E1 Application Protocol (E1AP) (Release 15)", 3GPP TS 38.463, V15.3.0, Mar. 2019, pp. 1-165.

"3rd Generation Partnership Project; Technical Specification Group Radio Access Network; NG-RAN; F1 general aspects and principles (Release 15)", 3GPP TS 38.470, V15.5.0, Mar. 2019, pp. 1-13.

"3rd Generation Partnership Project; Technical Specification Group Radio Access Network; NG-RAN; F1 application protocol (F1AP) (Release 15)", 3GPP TS 38.473, V15.5.0, Mar. 2019, pp. 1-198.

"Support for CLI", 3GPP TSG-RAN WG3 Meeting #104, R3-193233, Ericsson, May 13-17, 2019, pp. 1-16.

"3rd Generation Partnership Project; Technical Specification Group Radio Access Network; NR; NR and NG-RAN Overall Description; Stage 2 (Release 15)", 3GPP TS 38.300, V15.6.0, Jun. 2019, pp. 1-99.

"Cross-link Interference Management", 3GPP TSG-RAN WG3 Meeting #104, R3-193234, Ericsson, May 13-17, 2019, pp. 1-2.

"Intended DL&UL configuration for TS38.470", 3GPP TSG-RAN WG3 Meeting#104, R3-193235, ZTE, May 13-17, 2019, 2 pages.

"3rd Generation Partnership Project; Technical Specification Group Radio Access Network; Cross Link Interference (CLI) handling and Remote Interference Management (RIM) for NR; (Release 16)", 3GPP TR 38.828, V0.1.0, May 2019, pp. 1-27.

"3rd Generation Partnership Project; Technical Specification Group Radio Access Network; Cross Link Interference (CLI) handling and Remote Interference Management (RIM) for NR; (Release 16)", 3GPP TR 38.828, V0.2.0, May 2019, pp. 1-91.

"TP to TR 38.828—clean up-cover", 3GPP TSG-RAN WG4 Meeting #91, R4-1907599, Agenda Item: 8.2.1, Huawei, May 13-17, 2019, 28 pages.

"TP to TR 38.828: Addition of missing antenna configurations to simulation assumptions", 3GPP TSG-RAN WG4#91, R4-1907600, Agenda Item: 8.2.2, Ericsson, May 13-17, 2019, pp. 1-13.

"TP on simulation results and Annex A: Detailed simulation results for non-zero grid shift", 3GPP TSG-RAN WG4 RAN4 #91 Meeting, R4-1907603, Agenda item: 8.2.2, LG Electronics, May 13-17, 2019, 55 pages.

"TP on summary and recommendations of TR 38.828", 3GPP TSG-RAN WG4 RAN4 #91 Meeting, R4-1907605, Agenda item: 8.2.2, LG Electronics, May 13-17, 2019, 4 pages.

"WF on summary and recommendations for co-existence evaluation of CLI", 3GPP TSG-RAN WG4 Meeting RAN4#91, R4-1907606, Agenda: 8.2.1, May 13-17, 2019, pp. 1-7.

"New WID: Integrated Access and Backhaul for Nr", 3GPP TSG RAN Meeting #82, RP-182882, Agenda Item: 9.1.2, Qualcomm, Dec. 10-13, 2018, 7 pages.

"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

Lukowa et al., "Performance of strong interference cancellation in flexible UL/DL TDD systems using coordinated muting, scheduling and rate allocation", IEEE Wireless Communications and Networking Conference, Apr. 3-6, 2016, 7 pages.

Venkatasubramanian et al., "On the performance gain of flexible UL/DL TDD with centralized and decentralized resource allocation in dense 5G deployments", IEEE 25th Annual International Symposium on Personal, Indoor, and Mobile Radio Communication (PIMRC), Sep. 2-5, 2014, pp. 1840-1845.

Lee et al., "Aligned Reverse Frame Structure for Interference Mitigation in Dynamic TDD Systems", IEEE Transactions on Wireless Communications, vol. 16. No. 10, Oct. 2017, pp. 6967-6978.

Guo et al., "Dynamic TDD and interference management towards 5G", IEEE Wireless Communications and Networking Conference (WCNC), Apr. 15-18, 2018, 6 pages.

Baracca, "Traffic Profile Based Clustering for Dynamic TDD in Dense Mobile Networks", IEEE 84th Vehicular Technology Conference (VTC-Fall), Sep. 18-21, 2016, 6 pages.

"Summary of 7.2.3.1 Enhancements to support NR backhaul links", 3GPP TSG RAN WG1 Meeting #95, R1-1814127, Agenda Item: 7.2.3.1, AT&T, Nov. 12-16, 2018, 25 pages.

"Control plane functions for High Layer split", 3GPP TSG-RAN WG3 Meeting #95 bis, R3-170974, Agenda Item: 10.11.1, IAESI, Apr. 3-7, 2017, 2 pages.

"F1AP function definition and categorization", 3GPP TSG-RAN WG3 Meeting Ad Hoc, R3-172246, Agenda item: 10.10.2, Samsung, Jun. 27-29, 2017, 4 pages.

"F1 signalling for CLI management", 3GPP TSG RAN WG3 Meeting #103bis, R3-192084, Ericsson, Apr. 8-12, 2019, pp. 1-8.

"CSI measurement and reporting for coordinated transmission scheme", 3GPP TSG RAN WG1 Meeting #87, R1-1611674, Agenda Item: 7.1.3.3, Huawei, Nov. 14-18, 2016, pp. 1-5.

Office Action received for corresponding European Patent Application No. 19759550.7, dated Mar. 12, 2024, 5 pages.

* cited by examiner

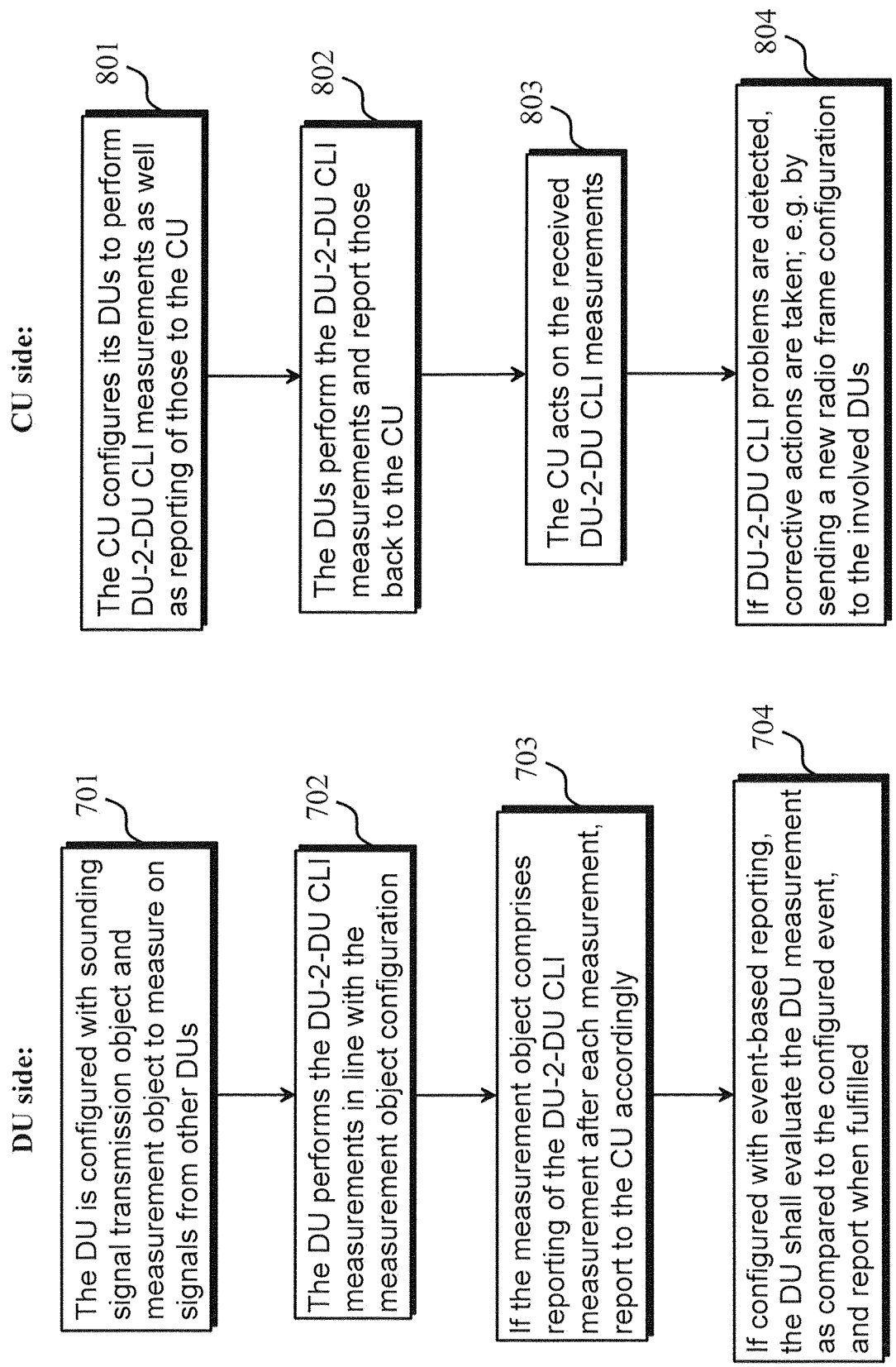

CROSS-CHANNEL MEASUREMENT CONTROL AND CONFIGURATION

CROSS-REFERENCE TO RELATED APPLICATION

This application is the National Stage of, and therefore claims the benefit of, International Application No. PCT/EP2019/072676 filed on Aug. 26, 2019, entitled "CROSS-CHANNEL MEASUREMENT CONTROL AND CONFIGURATION," which was published in English under International Publication Number WO 2021/037333 on Mar. 4, 2021, is commonly assigned with this National Stage application, and is incorporated herein by reference in its entirety.

Technical Field

Various example embodiments relate to 5G New Radio (NR) with time division du-plexing (TDD), and especially to cross-link interference (CLI) issues in such mobile telecommunications systems.

Background

Base station (BS) to Base Station cross-link interference (BS-2-BS CLI) and User Equipment (UE) to User Equipment cross-link interference (UE-2-UE CLI) have been identified as major limitations against the dynamic TDD operation where BS nodes (a.k.a. gNBs) can "freely" change their transmission directions (uplink or downlink) depending on e.g. offered traffic conditions.

So far, definitions and also standardization have been performed for UE-2-UE CLI measurements, associated procedures, and UE CLI measurement requirements, which is currently ongoing in 3GPP. However, due to the higher output transmit power and antenna gains at the gNBs, BS-to-BS CLI is often more critical than the UE-2-UE CLI, and therefore solutions for identification of BS-to-BS CLI via related measurements and coordination procedures are of high importance.

The problem at hand is therefore, how to enable and coordinate efficient BS-to-BS measurements. That is, how to configure BS transmissions for other BSs to measure, definition of novel BS transmission objects, objects for cross-BS measurements, and related procedures.

Following requirements and conclusions (i.e. scenarios) have been outlined for RAN4 TDD RF coexistence situations allowing dynamic TDD.

For frequency range 1 (<6 GHz) macro-to-macro: Performance degradation was observed from the BS-to-BS interference for macro-macro scenario, which suggests that dynamic TDD should not be operated in such scenarios.

For frequency range 1 (<6 GHz) indoor: The observations imply that dynamic TDD can be used in indoors as long as care is taken.

The problem is how to handle the careful planning and collaboration between operators and how to take care as well as possible in situations, where RAN4 TDD RF coexistence might occur allowing dynamic TDD, for both FR1 and FR2 in various circumstances.

General overview of the 5G NR architecture is discussed next. FIG. 1 illustrates the same. It can be seen in "3GPP technical specification 38.401, "Technical Specification Group Radio Access Network; NG-RAN; Architecture description", Version 15.1.0, Release 15, Mar. 2018."

Main parts there are a 5G core network (5GC) 101, and a Next Generation Radio Access Network (NG-RAN) 102. Base stations (gNB) 103a, 103b locate within the NG-RAN. The architecture comprises an Xn-C interface 106 between the gNBs 103a, 103b to coordinate by means the XnAP procedures as defined in 3GPP TS 38.423, as well as an NG interface 107a, 107b towards the 5G core network (5GC) 101. The 5G NR architecture also allows C-RAN implementations with one or multiple centralized units (gNB-CU 104), each serving a large number of distributed units (gNB-DU 105a-b). Such CU-DU options are made possible by the introduction of the two new interfaces named E1 (between the control and user plane in the CU; not shown) and F1 (between the CU and DU) 108a-b, as specified in:

E1 interface: TS 38.460 (Stage 2); TS 38.463 (Stage-3)
F1 interface: TS 38.470 (Stage 2); TS 38.473 (Stage 3)

The problem field is to focus on enhancements for the F1 interface to facilitate BS-to-BS (or equivalently DU-to-DU) cross-link interference (CLI) measurements and related orchestration of such procedures.

These enhancements can be called as an extended F1 interface or in other words, as an F1* interface. This is discussed later in the detailed description in detail.

Document "Summary of 7.2.3.1 Enhancements to support NR backhaul links", 3GPP TSG RAN WG1 Meeting # 95, R1-1814127, Spokane, USA, 12-16 Nov. 2018 discloses many proposals by several participating corporations in the standardizing work.

There are some further studies on dynamic or coordinated TDD performance. Some of those studies assume the knowledge of BS-2-BS radio propagation characteristics, and it is naturally common knowledge that such information may be extracted by having one BS transmit a signal, while another BS measures this signal.

However, there seems to be no disclosure in the open literature that discloses specific procedures to enable and orchestrate efficient BS-cross measurements, comprising beam-based cross-BS measurements, as well as inter-operator (i.e. adjacent channel/carrier) measurements as means to help ensuring proper coexistence.

SUMMARY

The scope of protection sought for various example embodiments of the invention is set out by the independent claims.

The embodiments, examples, and features described in this specification that do not fall under the scope of the independent claims are to be interpreted as examples useful for understanding various embodiments of the invention.

An example embodiment describes a method implementable in a centralized unit (CU) (301, 601) of a mobile telecommunication system, the method comprising the steps of:

configuring (304, 305) a distributed unit sounding signaling transmission object and a distributed unit cross-link measurement object to at least two separate distributed units (DU) (302, 303, 602, 604) in succession, and after a sounding signal measurement (307) between the DUs (302, 303, 602, 604) over an air interface (308) in a first direction, receiving reporting (309) of the first DU-to-DU cross-link interference (CLI) measurement corresponding to the first direction, and after a sounding signal measurement (310) between the DUs (302, 303, 602, 604) over an air interface (312) in a second direction opposite to the first direction, receiving reporting (313) of the second DU-to-DU cross-link interference (CLI) measurement corresponding to the second direction.

An example embodiment describes a method implementable in a distributed unit (DU) (302, 602) of a mobile telecommunications system, the method comprising the steps of:
receiving a configuration of a distributed unit sounding signaling transmission object and a distributed unit cross-link measurement object from a centralized unit (CU) (301, 601),
transmitting (306) a first sounding signal to another distributed unit (303, 604) over an air interface (308),
measuring (310) a second sounding signal transmitted by the another distributed unit (303, 604) over an air interface (312), thus obtaining a DU-to-DU cross-link interference measurement result, and
reporting (313) the DU-to-DU cross-link interference measurement result to the centralized unit (CU) (301, 601).

An example embodiment describes a centralized unit (CU) (301, 601), being part of a mobile telecommunication system, the CU (301, 601) comprising:
at least one processor,
at least one memory comprising computer program code,
the at least one memory and the computer program code configured to, with the at least one processor, cause the CU (301, 601) at least to perform the steps of:
configuring (304, 305) a distributed unit sounding signaling transmission object and a distributed unit cross-link measurement object to at least two separate distributed units (DU) (302, 303, 602, 604) in succession, and after a sounding signal measurement (307) between the DUs (302, 303, 602, 604) over an air interface (308) in a first direction,
receiving reporting (309) of the first DU-to-DU cross-link interference (CLI) measurement corresponding to the first direction, and after a sounding signal measurement (310) between the DUs (302, 303, 602, 604) over an air interface (312) in a second direction opposite to the first direction,
receiving reporting (313) of the second DU-to-DU cross-link interference (CLI) measurement corresponding to the second direction.

An example embodiment describes a distributed unit (DU) (302, 602), being part of a mobile telecommunication system, the DU (302, 602) comprising:
at least one processor,
at least one memory comprising computer program code,
the at least one memory and the computer program code configured to, with the at least one processor, cause the DU (302, 602) at least to perform the steps of:
receiving a configuration of a distributed unit sounding signaling transmission object and a distributed unit cross-link measurement object from a centralized unit (CU) (301, 601),
transmitting (306) a first sounding signal to another distributed unit (303, 604) over an air interface (308),
measuring (310) a second sounding signal transmitted by the another distributed unit (303, 604) over an air interface (312), thus obtaining a DU-to-DU cross-link interference measurement result, and
reporting (313) the DU-to-DU cross-link interference measurement result to the centralized unit (CU) (301, 601).

An example embodiment describes a mobile telecommunication system comprising
a centralized unit (CU) (301, 601) within a base station (gNB), which CU (301, 601) is arranged to
configure (304, 305) a distributed unit sounding signaling transmission object and a distributed unit cross-link measurement object to at least two separate distributed units (DU) (302, 303, 602, 604) in succession, and after a sounding signal measurement (307) between the DUs (302, 303, 602, 604) over an air interface (308) in a first direction,
receive reporting (309) of the first DU-to-DU cross-link interference (CLI) measurement corresponding to the first direction, and after a sounding signal measurement (310) between the DUs (302, 303, 602, 604) over an air interface (312) in a second direction opposite to the first direction,
receive reporting (313) of the second DU-to-DU cross-link interference (CLI) measurement corresponding to the second direction,
the system further comprising
at least two distributed units (DU) (302, 303, 602, 604) within a base station (gNB), where a first DU (302, 602) is arranged to
receive a configuration of a distributed unit sounding signaling transmission object and a distributed unit cross-link measurement object from a centralized unit (CU) (301, 601),
transmit (306) a first sounding signal to another distributed unit (303, 604) over an air interface (308),
measure (310) a second sounding signal transmitted by the another distributed unit (303, 604) over an air interface (312), thus obtaining a DU-to-DU cross-link interference measurement result, and
report (313) the DU-to-DU cross-link interference measurement result to the centralized unit (CU) (301, 601).

An example embodiment describes a computer program comprising instructions for causing a centralized unit (CU) of a mobile telecommunication system to perform at least the following steps:
configuring (304, 305) a distributed unit sounding signaling transmission object and a distributed unit cross-link measurement object to at least two separate distributed units (DU) (302, 303, 602, 604) in succession, and after a sounding signal measurement (307) between the DUs (302, 303, 602, 604) over an air interface (308) in a first direction,
receiving reporting (309) of the first DU-to-DU cross-link interference (CLI) measurement corresponding to the first direction, and after a sounding signal measurement (310) between the DUs (302, 303, 602, 604) over an air interface (312) in a second direction opposite to the first direction,
receiving reporting (313) of the second DU-to-DU cross-link interference (CLI) measurement corresponding to the second direction.

An example embodiment describes a computer program comprising instructions for causing a distributed unit (DU) of a mobile telecommunication system to perform at least the following steps:
receiving a configuration of a distributed unit sounding signaling transmission object and a distributed unit cross-link measurement object from a centralized unit (CU) (301, 601),
transmitting (306) a first sounding signal to another distributed unit (303, 604) over an air interface (308), measuring (310) a second sounding signal transmitted by the another distributed unit (303, 604) over an air interface (312), thus obtaining a DU-to-DU cross-link interference measurement result, and reporting (313) the DU-to-DU cross-link interference measurement result to the centralized unit (CU) (301, 601).

An example embodiment describes a non-transitory computer readable medium comprising program instructions for causing a centralized unit (CU) of a mobile telecommunication system to perform at least the following steps:

configuring (304, 305) a distributed unit sounding signaling transmission object and a distributed unit cross-link measurement object to at least two separate distributed units (DU) (302, 303, 602, 604) in succession, and after a sounding signal measurement (307) between the DUs (302, 303, 602, 604) over an air interface (308) in a first direction, receiving reporting (309) of the first DU-to-DU cross-link interference (CLI) measurement corresponding to the first direction, and after a sounding signal measurement (310) between the DUs (302, 303, 602, 604) over an air interface (312) in a second direction opposite to the first direction, receiving reporting (313) of the second DU-to-DU cross-link interference (CLI) measurement corresponding to the second direction.

An example embodiment describes a non-transitory computer readable medium comprising program instructions for causing a distributed unit (DU) of a mobile telecommunication system to perform at least the following steps:

receiving a configuration of a distributed unit sounding signaling transmission object and a distributed unit cross-link measurement object from a centralized unit (CU) (301, 601), transmitting (306) a first sounding signal to another distributed unit (303, 604) over an air interface (308), measuring (310) a second sounding signal transmitted by the another distributed unit (303, 604) over an air interface (312), thus obtaining a DU-to-DU cross-link interference measurement result, and reporting (313) the DU-to-DU cross-link interference measurement result to the centralized unit (CU) (301, 601).

Many other example embodiments are described in dependent claims and in the detailed description.

BRIEF DESCRIPTION OF THE DRAWINGS

Some example embodiments will now be described with reference to the accompanying drawings.

FIG. 7 shows a simple illustration of the procedure according to an example embodiment, for coordinated cross-link co-channel measurements from a DU side, FIG. 8 shows a simple illustration of the procedure according to an example embodiment, for coordinated cross-link co-channel measurements from a CU side.

DETAILED DESCRIPTION

Figure 1:
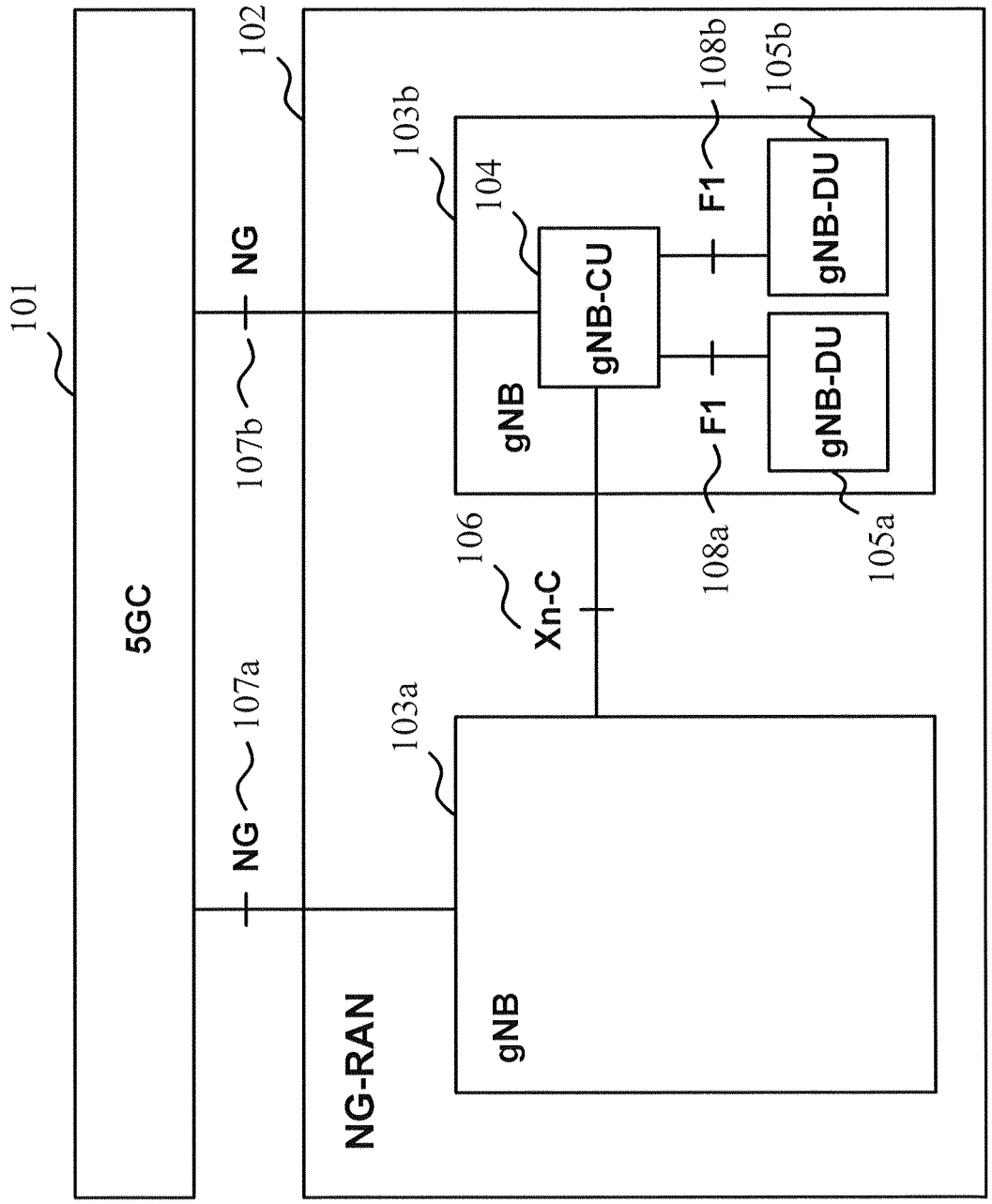
FIG. 1 shows a general overview of the 5G NR architecture.

The example embodiments provide solutions for identification of BS-to-BS CLI via related measurements and coordination procedures. Secondly, the example embodiments also comprise means for coordinated adjacent carrier network sensing to enable efficient TDD coexistence on possible scenarios where dynamic TDD may be allowed without causing inter-operator coexistence problems. The example embodiments also comprise IAB (Integrated access and backhaul) nodes where interference between IAB nodes and gNB, and IAB interference can be addressed.

In the following example embodiments, the following concept and set of procedures for coordinated inter-BS measurement procedures are introduced. For the case with the CU-DU (i.e. centralized unit—distributed unit) network architecture, the following principles are introduced in an example embodiment of the invention:

1. The centralized unit (CU) is the master and has the global overview of traffic intensity in the network, and acts as kind of master for the distributed units (DUs).
2. The CU could orchestrate co-channel DU-to-DU measurements, and also DU adjacent channel sensing for the purpose of TDD RF coexistence.
3. The CU may configure DUs with new transmit sounding signal transmission objects and new cross-link measurement objects. These are realized via new F1 (interface) procedures, comprising new attributes (also known as information elements).
4. The CU is thereby able to orchestrate co-channel transmit/receive coordination for its DUs, such that e.g. only one DU transmits at a time, while others are measuring on the transmitted sounding signal. This creates framework for coordination of interference-free measurements.
5. The co-channel DU-to-DU measurements are used to estimate path loss between DUs, and also for estimating the complex channel matrix between the DUs. The co-channel DU-to-DU measurements may comprise also beam-domain measurements. Measurement results are reported back from the DUs to the CU.
6. For cases where DUs are using beamforming (say e.g. GoB (i.e. Grid-of-Beams) for FR2 frequency band (i.e. 24.25 GHz . . . 52.6 GHz)), the CU may instruct the DUs with certain transmit patterns for different beams, as well as instruct DUs to measure on multiple beams.
7. In the simplest form, DUs that are transmitting a sounding signal, for other DUs to measure on, it could be the channel state information reference signal (CSI-RS). In another example embodiment, the CU may instruct the transmitting DUs to transmit a known data packet (i.e. Transport block with known data, on certain Physical Resource Blocks (PRBs) with known Modulation and Coding Scheme (MCS) of e.g. QPSK 1/6).

This would improve the estimation accuracy as it would correspond to transmitting "known pilots" on all resources.

8. For the purpose of TDD RF coexistence, the CU may also instruct DUs to perform adjacent channel measurements, or measurements of induced interference from adjacent carriers, to sense if there is critical adjacent channel operation that should be taken into account. This is enabled through new definition of DU Adjacent Carrier Measurement Objects (i.e. new F1 signaling procedure with new Information Elements).

9. For the case of IAB, the CU will via the DU schedule both the transmission object as well as the measurement object. This will be configured via the extended F1 interface.

For the above principles to come true, a new set of distinct F1 procedures must be defined. More details related to such F1 procedures are described in the following section disclosing these example embodiments.

In an example embodiment, efficient centralized orchestration of base station cross-link radio measurements for efficient TDD co-channel and adjacent channel operation are obtained by means of the following six features:

1) F1 signaling procedures for configuring DUs with co-channel new sounding signal cross-link transmission objects (and related parameters/behaviors).
2) F1 signaling procedures for configuring DUs with new cross-link measurement objects (and related parameters/behaviors).
3) Related parameters/behaviors comprise time-frequency-beam-specific transmission and measurement patterns, and reporting conditions.
4) It is noted that features 1-3 above enable the CU to coordinate the behavior of the involved DUs to perform interference-free co-channel cross-link measurements.
5) Orchestration of NW-based adjacent channel sensing for ensuring good inter-operator co-existence so the CU can control the DUs to avoid TDD RF coexistence problems.
6) Centralized orchestration of NW-based adjacent channel sensing of IAB nodes (via the DUs) using the extended F1 interface (a.k.a. the F1* interface).

In an example embodiment, the method may be implemented as follows: The CU sends a message over the F1 interface to instruct the DU to perform a sounding signal transmission(s) for other DUs to measure, as well as when other DU(s) shall measure on such sounding signals. The CU-to-DU signalling may be introduced as a new procedure, or a set of procedures, for the F1 interface, comprising multiple information elements (IEs).

The part of the procedure that instructs the DU to transmit a sounding signal for other DUs to measure may comprise the following IEs (i.e. new DU co-channel transmission objects to enable cross-link measurements):

Timing of when the DU shall transmit the sounding signal:
  I. This may be expressed in terms of system frame number, over which slots and/or symbols it should be transmitted.
  II. The timing information might be expressed as a vector with multiple time occasions where the sounding signal shall be transmitted.

Type of sounding signal and transmission resources:
  I. As a non-limiting example embodiment, the sounding signal may simply be the Channel State Information Reference Signal (CSI-RS). It may be transmitted over a part of the carrier bandwidth, or on the full carrier bandwidth.
  II. In another example embodiment, the CU may configure the DU to transmit a known transport block over a certain set of PRBs (i.e. including both Demodulation reference signal (DM-RS) and Data symbols). This may be denoted as a "super sounding signal" where a richer deterministic signal is transmitted over many more resource elements as compared to the sparser CSI-RS. The advantage of this option is improved opportunities for the receiving DUs to perform more accurate measurements and/or channel estimation.

Optional transmit beamforming sounding signal configuration:
  I. If the DU is equipped with beamforming capabilities, configuration of the DU's sounding signal transmission may also comprise beamforming specifics.
  II. This may e.g. comprise configuration of the DU to transmit different sounding signals on multiple beams in parallel, or in a time-swept manner. With this option, the DUs which receive the sounding signals will be able to estimate the channel from different transmit beams of the other DUs.

The following information elements for instructing the DUs, when they shall measure on the transmitted sounding signals from other DUs, may comprise the following (i.e. new DU co-channel transmission objects to enable cross-link measurements) in an example embodiment:

Timing of when a DU shall measure on sounding signal(s) by other DU(s):
  I. This may be expressed in terms of system frame number, over which slots and/or symbols it should measure.
  II. The timing information might be expressed as a vector with multiple time occasions where the DU shall measure on sounding signals from different DUs.

Type of sounding signal and resources it shall measure on:
  I. The DU shall be informed which sounding signal it shall measure on. This comprises informing the DU on which resource elements the sounding signal is transmitted in the slots where it occurs.
  II. In cases where the DU(s), transmitting the sounding signal(s), adopt beamforming, the DU that shall measure should also be informed of the transmit beamforming configuration of the sounding signal (see above).

Type of measurement and reporting:
  I. The CU instructs which type of measurement and reporting the DU shall perform. This may be enumerated e.g. as "Path-loss measurement" or "Complex channel measurement". Other options are also possible.
  II. Finally, the DU, performing the measurement(s) on the sounding signal(s), shall be instructed about how to report the measurement result back to the CU. This may be enumerated e.g. as "report immediately after each measurement" or "report at certain parameterized time instances".
  III. In another example embodiment, the CU may also instruct the DU performing the measurement(s) to perform certain local filtering of the measurements before reporting it back to the CU. The filtering of the sounding signal measurements may e.g. be expressed as a filtering factor in an IIR filter, or a time averaging of a FIR filter (moving average).

IV. In yet another example embodiment, the CU may also configure the DU with an event-based reporting criterion for sending the result of the sounding signal measurement back to the CU. As a non-limiting example embodiment, such an event may e.g. be defined as reporting the result of the measurement only if it is above a certain threshold, where the DU-to-DU CLI starts to become relevant.

Figure 2:
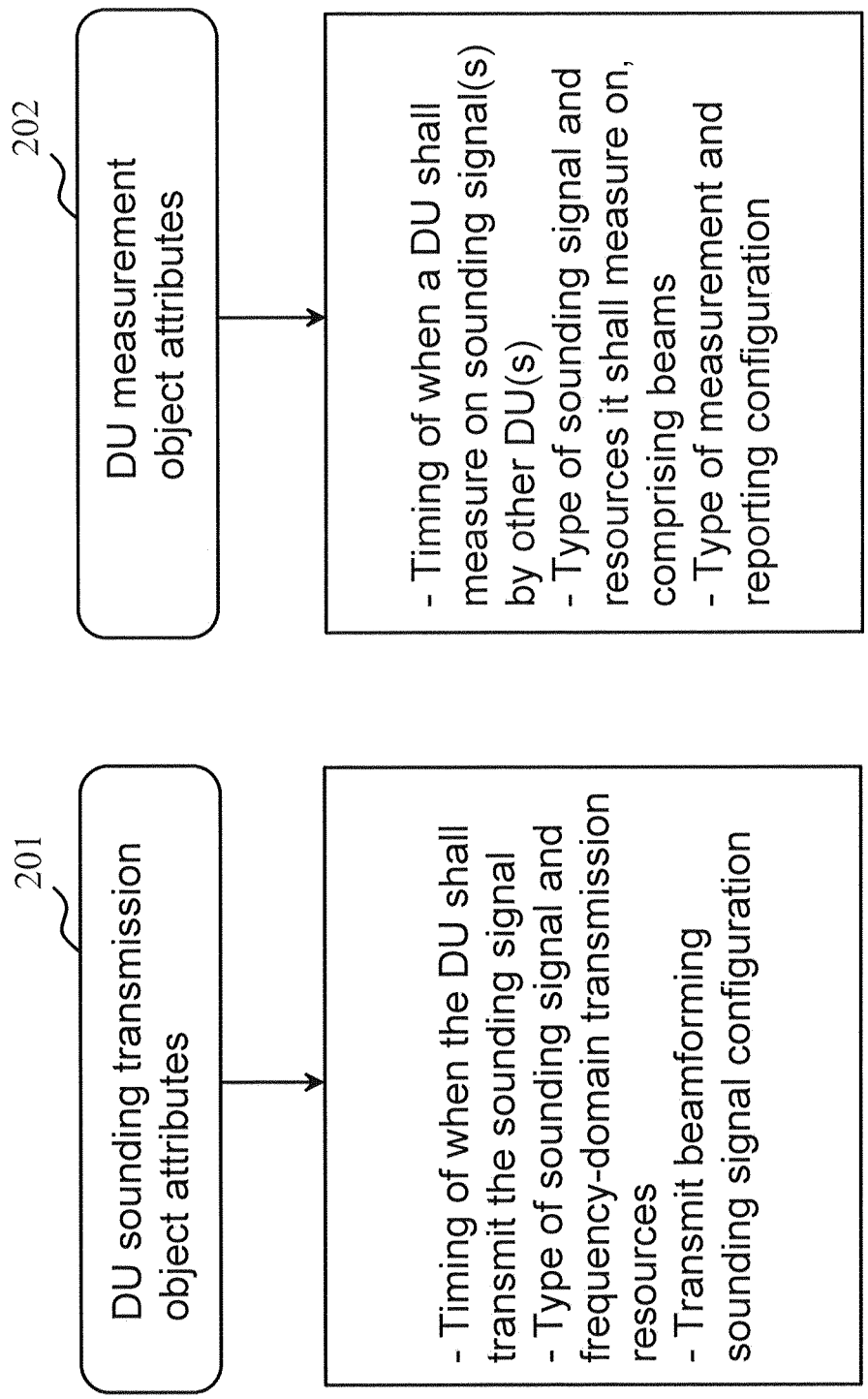
FIG. 2 illustrates a high-level overview of attributes (i.e. Information Elements) for the proposed DU sounding transmission object and DU measurement object to enable coordinated cross-link radio measurements in an example embodiment.

The above-mentioned configuration of the DUs sounding signal measurement may be denoted as a DU-to-DU measurement object configuration in this example embodiment. It essentially corresponds to the orchestration of channel sensing between the DUs. FIG. 2 summarizes the attributes (i.e. Information Elements) of the new DU transmission and measurement objects to enable coordinated cross-link radio measurements.

Figure 3:
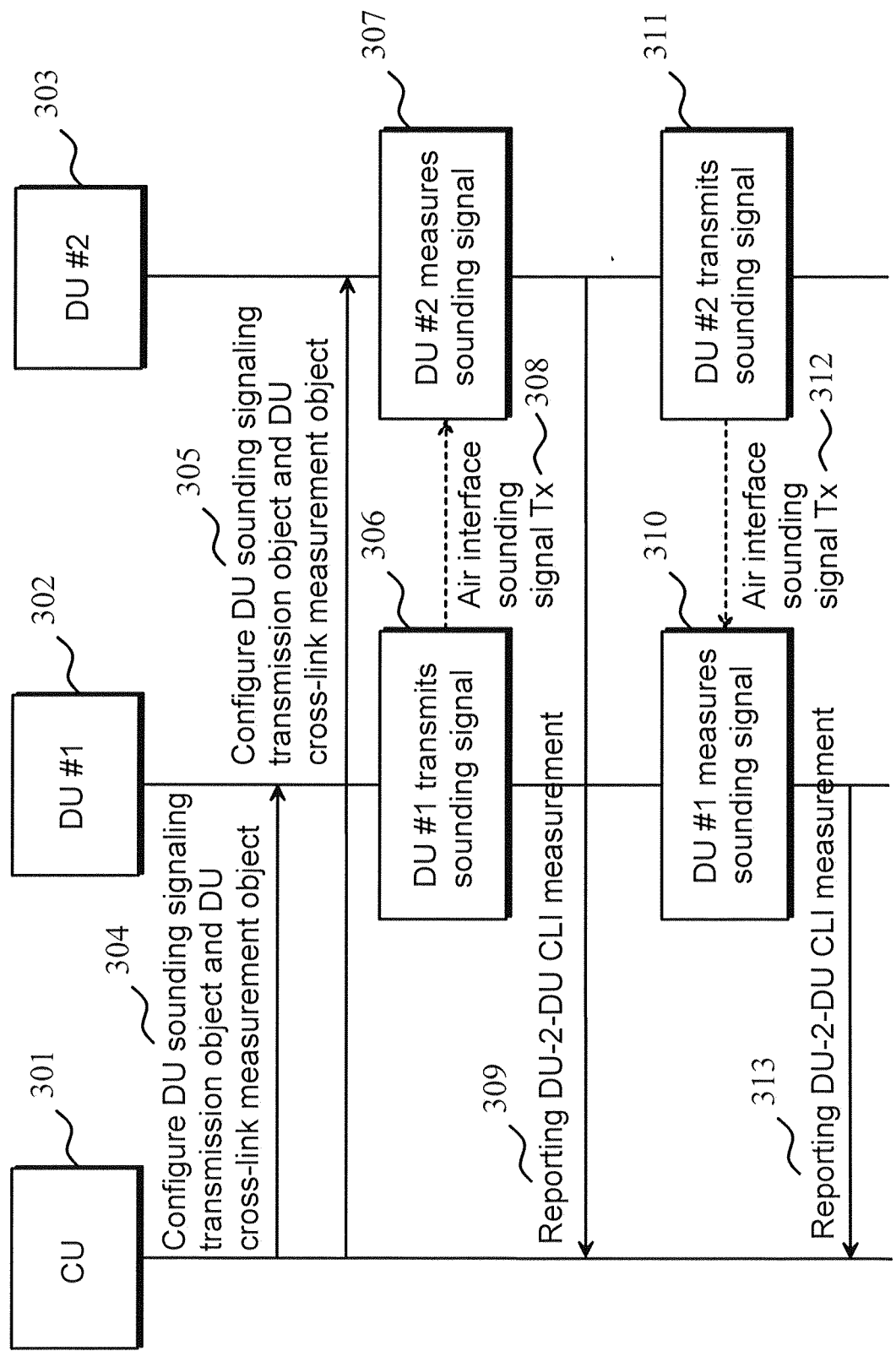
FIG. 3 shows an example of F1 signalling flow diagram.

FIG. 2 illustrates a high-level overview of attributes (i.e. Information Elements) for the proposed DU sounding transmission object and DU measurement object to enable coordinated cross-link radio measurements in an example embodiment. In other words, the DU sounding transmission object attributes 201 may comprise the following:

Timing of when the DU shall transmit the sounding signal
Type of sounding signal and frequency-domain transmission resources
Transmit beamforming sounding signal configuration Furthermore, the DU measurement object attributes 202 may comprise the following:

Timing of when a DU shall measure on sounding signal(s) by other DU(s)
Type of sounding signal and resources it shall measure on, comprising beams
Type of measurement and reporting configuration FIG. 3 shows a signalling flow diagram of the proposed F1 signalling messages between the CU 301 and its underlying DUs 302, 303 in an example embodiment. First, the DUs 302, 303 are configured 304, 305 with their sounding signal transmission parameters, as well as when to measure on sounding signals from other DUs. DU # 1 302 transmits 306 a sounding signal via an air interface 308, and DU # 2 303 measures 307 the sounding signal. Similarly, DU # 2 303 transmits 311 a sounding signal via an air interface 312, and DU # 1 302 measures 310 the sounding signal. Afterwards, the results 307, 310 of the DU-to-DU CLI measurement are reported 309, 313 back to the CU 301. Although the example embodiment in FIG. 3 is for two DUs 302, 303 only, the proposed solution scales to scenarios, where each CU hosts many more DUs. Also notice that the sounding signalling transmissions 306, 311 and measurements 307, 310 may be configured to happen periodically, and hence not only once per configuration as illustrated in FIG. 3.

Figure 4:
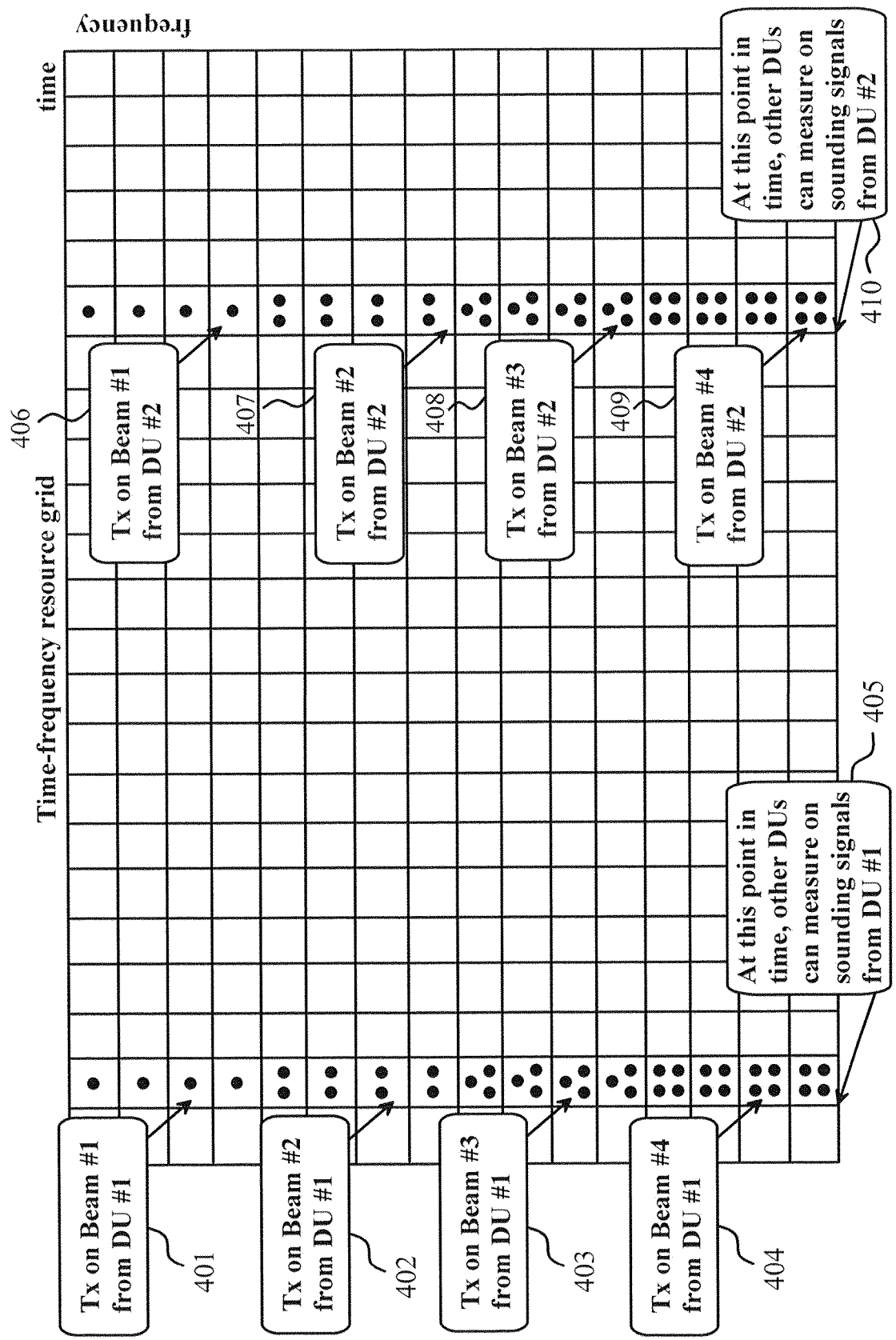
FIG. 4 illustrates a first example of time-frequency-beam resource transmission of DU sounding signals for cross-link measurement purposes.

FIG. 4 illustrates an example embodiment of how the CU may configure DU # 1 and DU # 2 to transmit (and measure) the sounding signals, shown as locating in a time-frequency resource grid. In this particular example embodiment, the sounding signals can be called cross-link sounding signals. In this particular example embodiment, DU # 1 is first transmitting 401-404 its sounding signals, using frequency domain multiplexing transmission on different beams, and some time later DU # 2 is transmitting 406-409 its sounding signals for DU # 1 to measure. In other words, distributed unit # 1 transmits the sounding signals concerning the different beams within a certain time slot but in different frequencies. In more detail, at first DU # 1 transmits the sounding signal 401 concerning beam # 1 in a predetermined frequency range which is illustrated by the exemplary four frequency slots each marked with a single dot in FIG. 4. At the same time slot, DU # 1 transmits the sounding signal 402 concerning beam # 2 in a predetermined frequency range which is illustrated by the exemplary four frequency slots each marked with double dots in FIG. 4. Correspondingly at the same time slot, DU # 1 transmits the sounding signal 403 concerning beam # 3 in a predetermined frequency range which is illustrated by the exemplary four frequency slots each marked with treble dots in FIG. 4. Furthermore, at the same time slot, DU # 1 transmits the sounding signal 404 concerning beam # 4 in a predetermined frequency range which is illustrated by the exemplary four frequency slots each marked with four dots in FIG. 4. At the start of the transmitting time slot (i.e. time range), other DUs can measure on sounding signals from DU # 1, marked as note 405 in FIG. 4. In this particular example embodiment, other DU means DU # 2.

Correspondingly, at a later time instant, in this example embodiment sixteen slot lengths later, the other distributed unit # 2 in turn transmits the sounding signal 406 concerning beam # 1 within the frequency range which can be the same as for the sounding signal transmitted from the 1st distributed unit for beam # 1. This frequency range i.e. used four slots are marked with a single dot in the right-hand part of FIG. 4. Similarly, as described for the 1st DU as a transmitter, the sounding signals transmitted from the DU # 2 for 2nd, 3rd and 4th beams are marked as Tx signals 407, 408 and 409, respectively. Also in a similar principle as in the above, the other DUs (here: DU # 1) can start measuring the sounding signals from DU # 2 starting in the beginning of the time slot, marked as note 410 in FIG. 4.

The illustrated grid structure, numbers of slots, and also the number of DUs are just exemplary values, and the example embodiments may comprise many other possibilities and numbers in the sounding signal allocation in the time-frequency grid.

Figure 5:
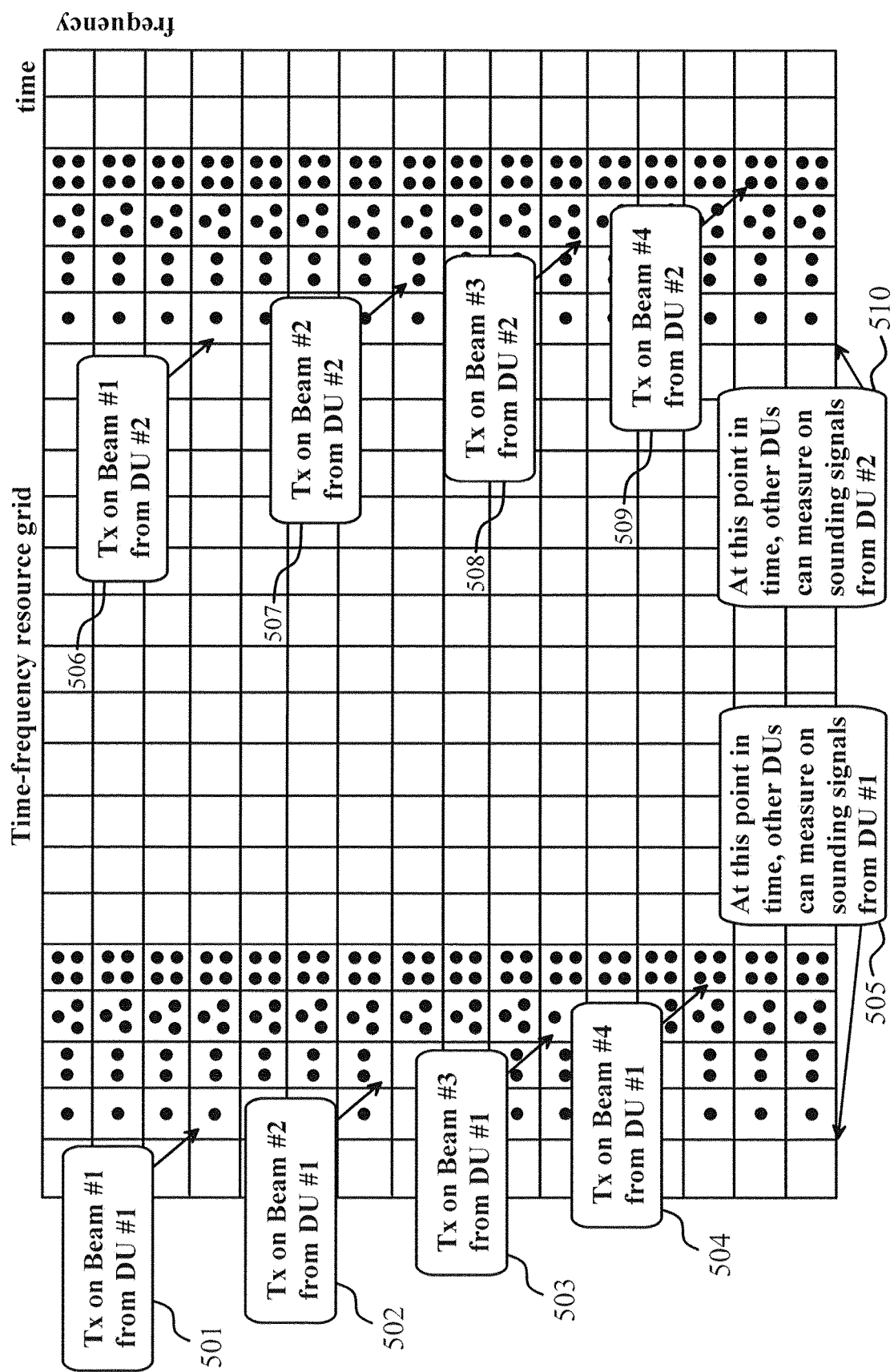
FIG. 5 illustrates a second example of time-frequency-beam resource transmission of DU sounding signals for cross-link measurement purposes.

Another example embodiment is illustrated in FIG. 5, showing how the CU may configure DU # 1 and DU # 2 to transmit (and measure) the (cross-link) sounding signals in a time-frequency resource grid. In this particular example embodiment, DU # 1 is first transmitting its sounding signals, using time-domain swept transmissions on different beams, and some time later DU # 2 is transmitting its sounding signals for DU # 1 to measure in a similar manner. In other words, the sounding signals from DU # 1 concerning different beams are transmitted consecutively in time, along all reserved frequencies. This is marked as "a first column" representing the transmitted sounding signal 501 for beam # 1, from DU # 1. Respectively, the next sounding signals 502, 503, 504 are transmitted consecutively for beams # 2, 3, and 4. The dot style marking is similar to FIG. 4. The measurement by DU # 2 may start at the beginning of the first transmission time slot, marked as 505. Similarly, the transmitted sounding signals from DU # 2 are marked as 506, 507, 508 and 509, as adjacent columns in the time-frequency grid. Similarly, as for the DU # 1 above, the next sounding signal transmission will start substantially instantly after the previous sounding signal transmission (i.e. the respective time slot) ends. DU # 1 can start measuring the sounding signals transmitted from DU # 2 at the start of the time slot marked in 510. In this example embodiment, the time difference between the first sounding signal by DU # 1 and the first sounding signal by DU # 2 is the length of sixteen time slots, but this is merely an example.

Figure 6:
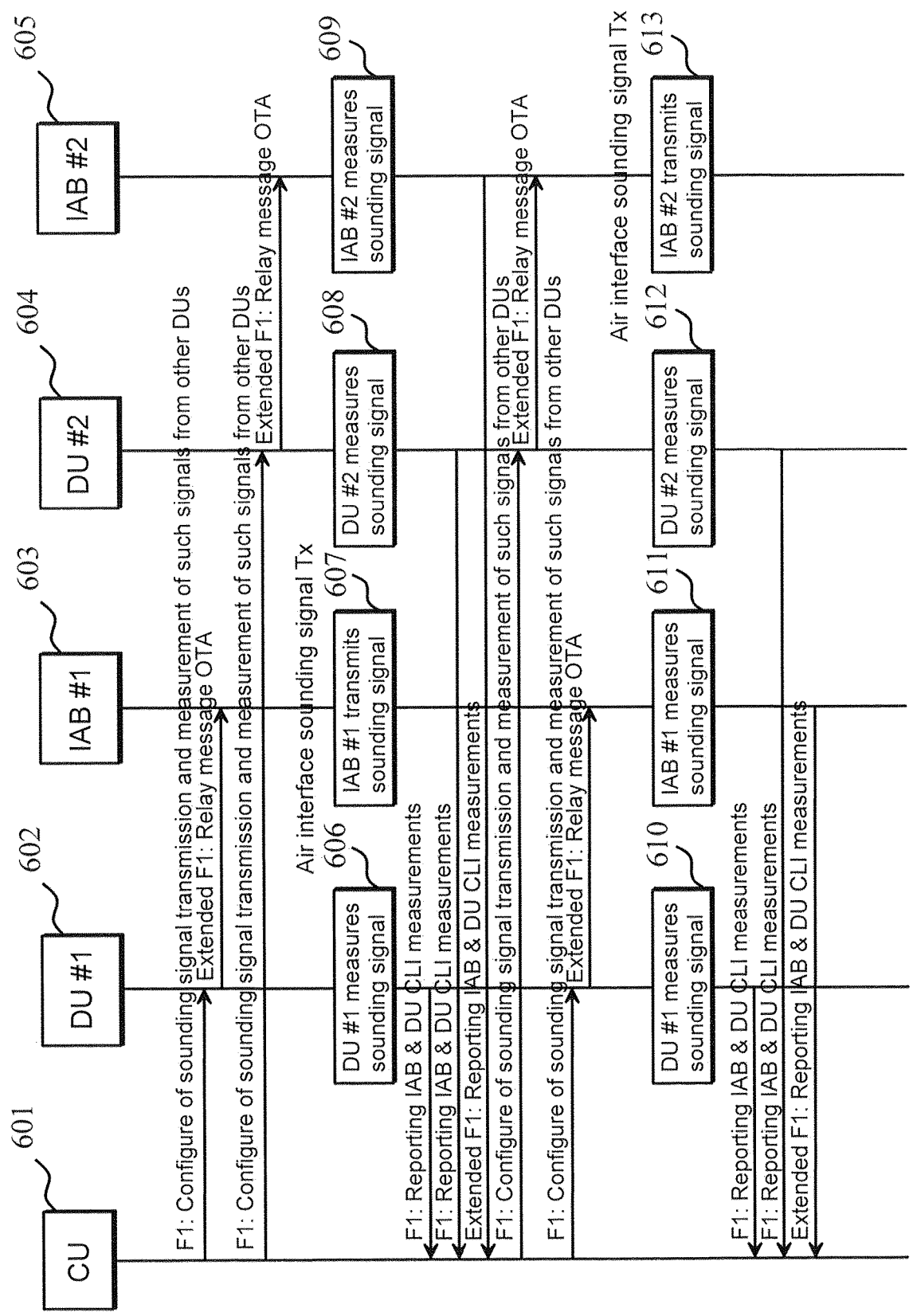
FIG. 6 illustrates an example of a signalling flow diagram for IAB, comprising the extended F1 interface.

FIG. 6 illustrates an example embodiment of a signalling flow diagram for Integrated Access and Backhaul (i.e. IAB).

This represents an extended version of the one already discussed in FIG. 3 and the example embodiment according to FIG. 6 also comprises an extended F1 interface, which was briefly introduced earlier.

In the case when IAB nodes are scheduled to transmit or measure, the signalling will comprise the transmit and measurement object over the air (i.e. OTA). The procedure is shown in the example of FIG. 6. The CU 601 will configure the DUs 602, 604 for the transmission objects and those will be relayed over the air using the extended F1 interface to the IAB node. The other DUs will be configured via the F1 interface to measure the sounding signals and the other IAB nodes will configure via the extended F1 interface with measurement objects. In principle, the configuration of the IAB nodes works in a similar way to the DUs, except the configuration is done using the extended F1 interface over the air via the feeding DU.

In more detail, the CU 601 will first configure the sounding signal transmission and measurement of such signals from other DUs, via the F1 interface to DU # 1 602. The DU # 1 602 will provide a relay message over the air via the extended F1 interface to IAB # 1 603. The CU 601 will then configure the sounding signal transmission and measurement of such signals from other DUs, via the F1 interface to DU # 2 604. The DU # 2 604 will provide a relay message over the air via the extended F1 interface to IAB # 2 605. Next, IAB # 1 603 is the transmitting entity, and it transmits the sounding signal 607 through an air interface. The other three entities are measuring entities which means that DU # 1 602, DU # 2 604 and IAB # 2 605 all measure the transmitted sounding signal (steps 606, 608 and 609, respectively). After these measurements are completed, DU # 1 602 reports the IAB & DU cross-link interference measurements to the CU 601 via the F1 interface. Correspondingly, DU # 2 604 reports the IAB & DU cross-link interference measurements to the CU 601 via the F1 interface. Thereafter, IAB # 2 605 reports the IAB & DU cross-link interference measurements to the CU 601 via the extended F1 interface.

After that, another measurement round commences so that the CU 601 will first configure the sounding signal transmission and measurement of such signals from other DUs, via the F1 interface to DU # 2 604. The DU # 2 604 will provide a relay message over the air via the extended F1 interface to IAB # 2 605. Thereafter, the CU 601 will configure the sounding signal transmission and measurement of such signals from other DUs, via the F1 interface to DU # 1 602. The DU # 1 602 will provide a relay message over the air via the extended F1 interface to IAB # 1 603. Now the IAB # 2 605 is the transmitting entity meaning that IAB # 2 605 transmits the sounding signal 613 through an air interface. The other three entities are measuring entities which means that DU # 1 602, IAB # 1 603 and DU # 2 604 all measure the transmitted sounding signal (steps 610, 611 and 612, respectively). After these measurements are completed, DU # 1 602 reports the IAB & DU cross-link interference measurements to the CU 601 via the F1 interface. Correspondingly, DU # 2 604 reports the IAB & DU cross-link interference measurements to the CU 601 via the F1 interface. Thereafter, IAB # 1 603 reports the IAB & DU cross-link interference measurements to the CU 601 via the extended F1 interface. This completes the exemplary process diagram according to FIG. 6.

A complementary representation of an example embodiment is illustrated in the following two figures, i.e. in FIG:s 7 and 8. FIG. 7 shows, how the procedure works from a distributed unit (DU) point of view, in an example embodiment. FIG. 8 shows, how the procedure works from a centralized unit (CU) point of view, in an example embodiment. Herein, the CU first configures the DUs with sounding signal transmission objects and the corresponding measurement objects for the DU-to-DU cross-link measurements, and concerning also the reporting back to the CU. These phases are steps 701 and 801, respectively for a DU and a CU. The DU(s) perform(s) the DU-2-DU CLI measurements in line with the measurement object configuration, corresponding to steps 702 and 802, respectively for the DU side and the CU side. In the DU side, if the measurement object comprises reporting of the DU-2-DU CLI measurement (i.e. results) after each performed measurement, the DU reports the results to the CU accordingly 703. On the other hand, if configured with event-based reporting, the DU shall evaluate the DU measurement as compared to the configured event, and report when fulfilled 704. Once the CU receives the results of the measurements 802, it accordingly acts on those measurements 803. If the DU-to-DU CLI measurements e.g. indicate that no CLI problems between a certain set of DUs have occurred, the CU identifies that it can safely let those DUs use different radio frame configurations. On the other hand, if some of the DU-to-DU CLI measurements indicate CLI problems, the CU may take corrective actions 804 to adjust the radio frame configuration (i.e. to send a new radio frame configuration) of those DUs such that their radio frame configurations are aligned to avoid such cross-link interference. The flow charts according to FIG:s 7 and 8 represent certain example embodiments of the procedure, but also other procedural steps are possible within the example embodiments. In other words, FIG:s 7-8 are not meant as restrictive, exclusive embodiments on the discussed procedures.

While the disclosure so far has focused on describing the possible implementation for the coordinated cross-link co-channel measurements, we next describe an implementation related to the proposed TDD RF coexistence sensing according to an example embodiment, where the CU instructs DUs to perform adjacent channel measurements, or measurements of induced interference from adjacent carriers, to sense if there is a critical adjacent channel operator that should be taken into account. As already mentioned, this is enabled by introducing a new DU Adjacent Carrier Measurement Object (i.e. new F1 signaling procedure with new Information Elements) according to an example embodiment. The CU would basically instruct the DUs to temporary stop serving traffic in their cells for a short time period, and during that time period perform measurements to sense potential interference and/or the presence of one or more adjacent carrier operator(s). The attributes of the new DU Adjacent Carrier Measurement Object may comprise the following two characteristics:

Time period when the measurement shall be conducted. It may be as short as one slot, or spanning over multiple slots, radio frame configurations, etc.

Type of measurement: This may be enumerated as (examples only):
I. Measuring total received interference on the DU's currently used carrier (i.e. interference leaking from adjacent carriers).
II. Detecting the potential presence of 3GPP systems operation on adjacent carriers, as well as their received power level by the DU. This is essentially an inter-frequency measurement conducted by the DU, where it e.g. searches for Synchronization Signals from LTE or NR systems on adjacent carriers.

III. Measuring the received power level on an adjacent carrier of sounding signaling transmitted by another DU (as per earlier definitions of DU sounding signal transmission object).

IV. Beamformed measurements: The DU may be instructed by the CU to perform the measurements in I-Ill separately per beam (e.g. relevant for FR2 frequency band (i.e. 24.25 GHz . . . 52.6 GHz) with Grid-of-Beams), such that the CU essentially gets information about the space-domain adjacent carrier interference situation.

In an example embodiment, the reporting type can be simple reporting of measurements back to the CU after each conducted measurement, or event-based to e.g. only report measurements as per the "Adjacent Carrier Measurement Object", whenever relevant adjacent carrier interference/system operation is detected that needs to be taken into account. Thus, for such event-based reporting options, also thresholds or other conditions for the event reporting to happen shall be embedded in the "Adjacent Carrier Measurement Object" in such an example embodiment.

Figure 9:
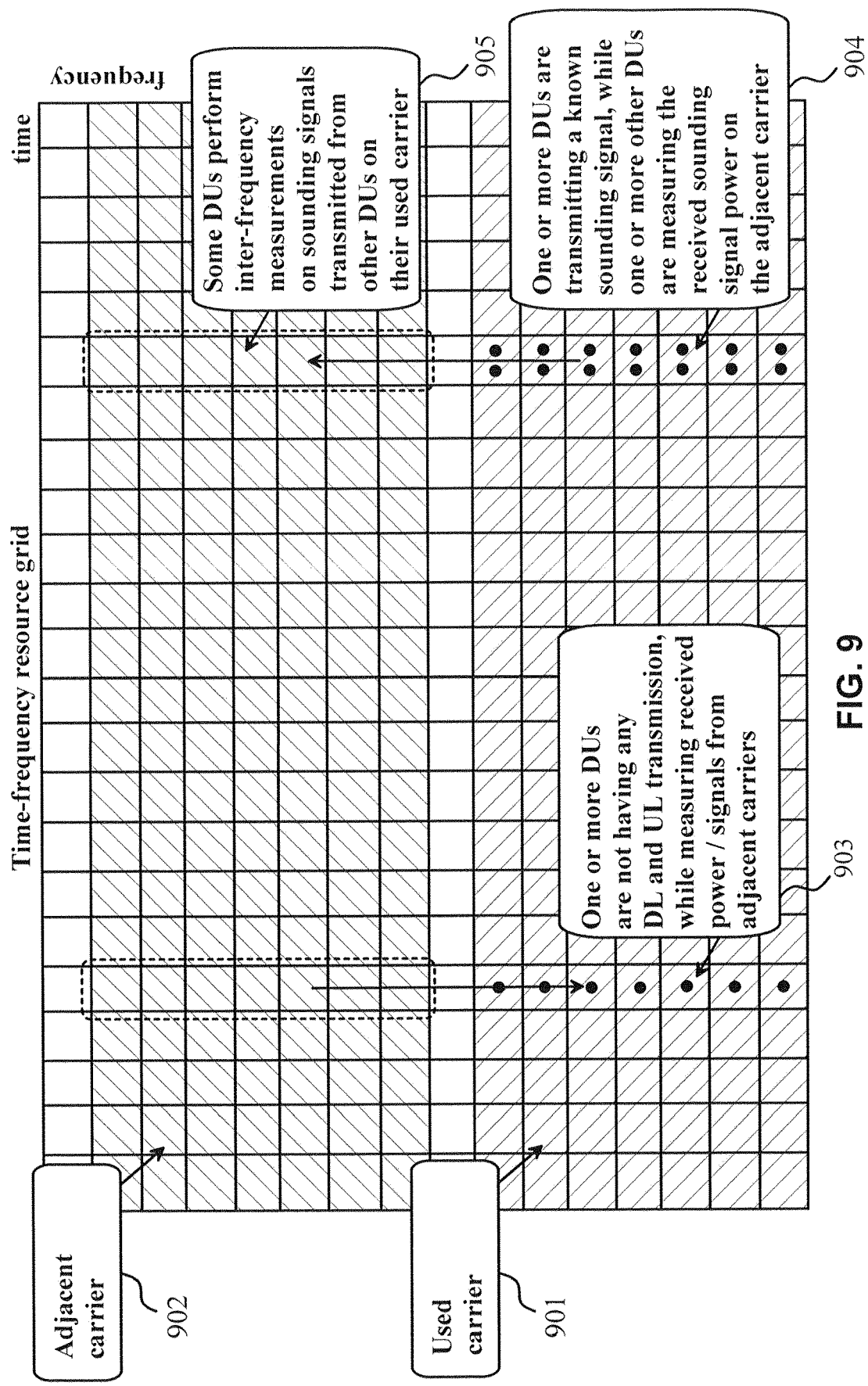
FIG. 9 illustrates adjacent carrier sensing for TDD RF coexistence purposes, in an example embodiment.

FIG. 9 illustrates the above adjacent carrier sensing for TDD RF coexistence purposes. Slots 901 represent the used carrier frequencies in the time-frequency resource grid (i.e. the lower slot area with diagonal lines), while slots 902 represent adjacent carrier frequencies in that same grid (i.e. the upper slot area with diagonal lines in other direction). There is a small mutual frequency gap (with one slot length in this example) between the two carrier frequency ranges 901, 902 but the length of the frequency gap is not that relevant in view of the example embodiments. The seven exemplary slots marked with note 903 in the used carrier frequency mean that the DU in the used carrier 901 measures received power and/or signals from adjacent carriers 902 when that measuring DU is not having any downlink and uplink transmissions. In other words, the DU in the used carrier 901 is "free" to measure the inter-carrier (i.e. inter-frequency) signals or power (i.e. the interference emerging from an adjacent carrier 902). The note 904 for the seven exemplary slots a bit later in time means that one or more DUs are transmitting a known sounding signal, while one or more other DUs are measuring the sounding signal power on the adjacent carrier 902. This same thing can be seen in note 905, which in other words means that some DUs perform inter-frequency measurements on sounding signals transmitted from other DUs on their used carrier 901. In other words, the adjacent carrier interference is measured through dual-direction measurements between the used carrier 901 and the adjacent carrier 902, revealing inter-carrier interference or more practically, other operating systems (i.e. operators) in the other carrier frequency. This information is obtained in this practical embodiment among the example embodiments, visualized in FIG. 9.

Figure 10:
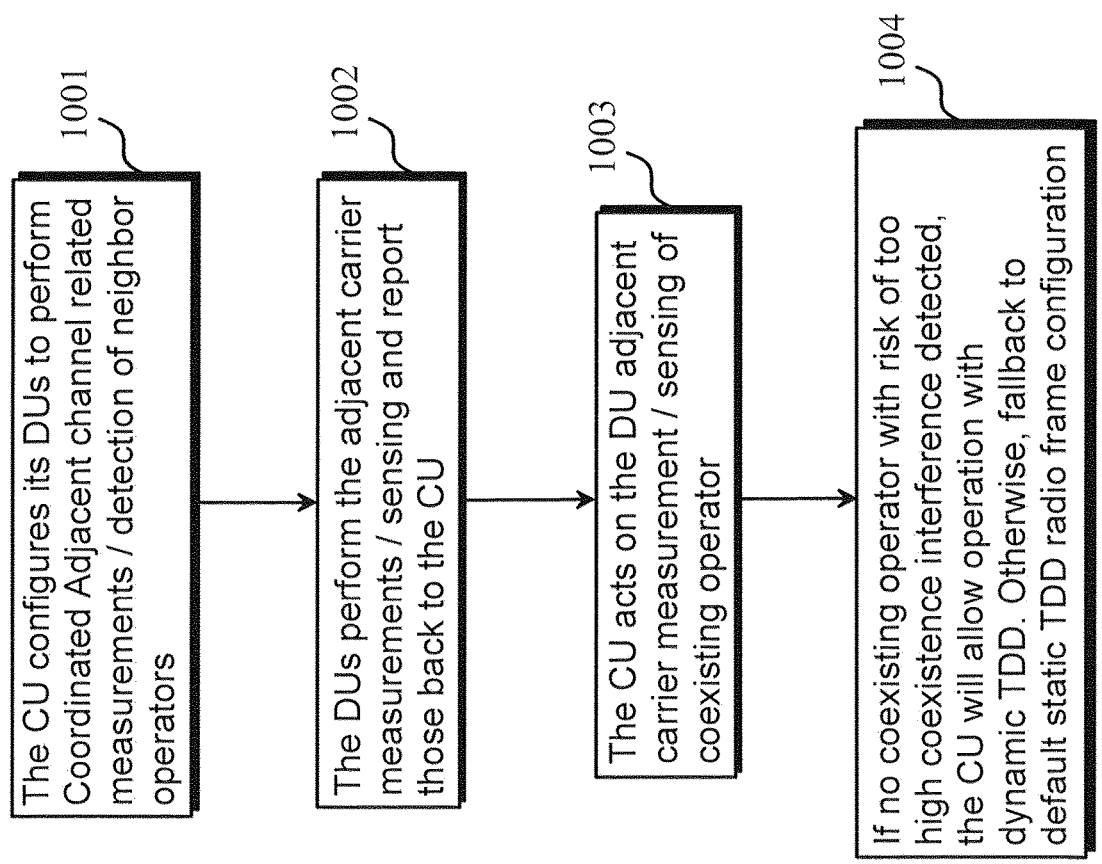
FIG. 10 shows a simple illustration of CU and DU procedures for TDD RF coexistence purposes, in an example embodiment.

FIG. 10 further illustrates the procedures related to adjacent channel measurements/sensing for the purpose of TDD RF coexistence, in an example embodiment. As shown there, the CU first organizes and commands the DU to perform the needed measurements via configuration of the "Adjacent Carrier Measurement Object". In other words, the CU configures its DUs to perform Coordinated Adjacent channel related measurements/detection of neighbor operators 1001. The DU thereafter performs the adjacent carrier measurements/sensing accordingly, and the results of those measurements are fed back (i.e. reported) to the CU 1002. The CU evaluates those measurement results, and if critical adjacent channel interference (e.g. from an operator using the adjacent carrier) occurs, then the CU instructs the DUs to use a default static TDD switching pattern (i.e. radio frame configuration) that is aligned with that operator, and typically dictated by the local spectrum authorities. In other words, the CU acts on the DU adjacent carrier measurement/sensing of coexisting operator 1003. On the contrary, if no critical adjacent channel interference or systems operation is detected, the CU knows that it can use dynamic TDD operation 1004 and thus, it can more freely inform the different DUs to use the TDD switching pattern that is the most attractive, given e.g. the offered traffic conditions for the different cells, etc. In other words in final step 1004, if no coexisting operator with risk of too high coexistence interference detected, the CU will allow operation with dynamic TDD. Otherwise, a fallback to a default static TDD radio frame configuration is possible.

The advantages of the example embodiments comprise the following. In summary, the presented procedures enable improved information for efficient network-based time division duplexing (TDD) coordination (e.g. selection of radio frame configuration) to boost the system performance without suffering from an unexpected crosslink interference (CLI). Also the presented procedures enable simple inter-operator sensing to only use dynamic TDD when it is feasible from a coexistence point-of-view.

This is achieved by efficient coordination of BS-to-BS (i.e. DU-2-DU) measurements that are of paramount importance for determining BS-to-BS CLI problems, if such neighboring BSs operate with opposite link directions (say one BS transmitting in the UL and the other BS trying to receive in the UL). Having such BS-to-BS measurements available are therefore very important for the network, and the related network performance optimizations. Given this, the CU can better determine and instruct the DUs, which radio frame configuration (i.e. UL/DL configuration) they shall use with a reduced risk of creating undesirable BS-to-BS cross-link interference. If the CLI measurements indicate none or marginal BS-to-BS CLI effects, the CU may then instruct the involved DUs to freely use any DL/UL configuration, which they see best. This is highly advantageous for the practical operability of the whole system.

A further advantage of the example embodiments is that they are well implementable in the framework of F1 interface specifications (i.e. standards) of TS 38.470 and TS 38.473.

The presented example embodiments provide a method which is transparent to the terminal side, and therefore, the method works for various generations and types of UEs, comprising e.g. Release-15 New Radio UEs.

It is to be noted that orders of the presented method (i.e. procedural) steps are not necessarily critical in the example embodiments.

The example embodiments (i.e. presented embodiments of the algorithm) can be implemented in a system comprising a network side supplied with at least one processor applying processing circuitry, and at least one User Equipment (UE) supplied with at least one processor applying processing circuitry as well, in an example embodiment. Additionally, at least one memory unit can be used as part of the system for storing the processed data and computer program(s) applying the presented algorithm among other needed operations. The processed data may comprise all or part of the required parameters used in the example embodiments.

As used in this disclosure, the term "circuitry" may refer to one or more or all of the following:

(a) hardware-only circuit implementations (such as implementations in only analog and/or digital circuitry), and
p1 (b) combinations of hardware circuits and software, such as (as applicable):
(i) a combination of analog and/or digital hardware circuit(s) with software/firmware, and
(ii) any portions of hardware processor(s) with software (including digital signal processor(s)), software, and memory(ies) that work together to cause an apparatus, such as a mobile phone or server, to perform various functions), and
(c) hardware circuit(s) and or processor(s), such as a microprocessor(s) or a portion of a microprocessor(s), that requires software (e.g. firmware) for operation, but the software may not be present, when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

The presented example embodiments may be applied in a wide range of technologies, for example, involving services, software, audio, virtual and augmented reality, digital health, materials, automotive and navigation technology, user interface, cellular and non-cellular network technology, optical network technology and enabling technology for Internet to name just a few technical areas.

The present invention is not restricted merely to example embodiments disclosed above, but the present invention is defined by the scope of the claims.

The invention claimed is:

1. A centralized unit (CU), being part of a mobile telecommunication system, the CU comprising:
at least one processor,
at least one memory comprising computer program code,
the at least one memory and the computer program code configured to, with the at least one processor, cause the CU at least to perform:
configuring a distributed unit sounding signaling transmission object and a distributed unit cross-link measurement object to at least two separate distributed units (DU) in succession, and after a sounding signal measurement between the DUs over an air interface in a first direction,
receiving reporting of the first DU-to-DU cross-link interference (CLI) measurement corresponding to the first direction, and after a sounding signal measurement between the DUs over an air interface in a second direction opposite to the first direction,
receiving reporting of the second DU-to-DU cross-link interference (CLI) measurement corresponding to the second direction,
wherein the CU is further caused to perform: after receiving the reportings concerning measurements in the first direction from both a DU among the at least two separate distributed units (DU) and another DU among the at least two separate distributed units (DU), receiving reporting of the measurement from an integrated access and backhaul nodes element (IAB) of the another DU among the at least two separate distributed units (DU) via an extended F1 interface.

2. The centralized unit (CU) according to claim 1, wherein the sounding signal is a channel state information reference signal (CSI-RS).

3. The centralized unit (CU) according to claim 1, wherein the sounding signal is a known data packet on determined Physical Resource Blocks (PRBs) with determined Modulation and Coding Scheme (MCS).

4. The centralized unit (CU) according to claim 1, wherein beamforming is applied so that different sounding signals concerning different, at least two, beams are directed to be transmitted by a DU among the at least two separate distributed units (DU) simultaneously in different frequency ranges, correspondingly.

5. The centralized unit (CU) according to claim 1, wherein beamforming is applied so that different sounding signals concerning different, at least two, beams are directed to be transmitted by a DU among the at least two separate distributed units (DU) consecutively within the same frequency range.

6. The centralized unit (CU) according to claim 1, wherein the CU is further caused to perform:
after receiving the reportings concerning measurements in the second direction from both a DU among the at least two separate distributed units (DU) and another DU among the at least two separate distributed units (DU), receiving reporting of the measurement from an integrated access and backhaul nodes element (IAB) of the DU among the at least two separate distributed units (DU) via the extended F1 interface.

7. The centralized unit (CU) according to claim 1, wherein the CU is further caused to perform the step of:
if a received measurement indicate a DU-to-DU cross-link interference problem, performing a corrective action by sending a new radio frame configuration to the involved DUs.

8. A method comprising:
configuring a distributed unit sounding signaling transmission object and a distributed unit cross-link measurement object to at least two separate distributed units (DU) in succession, and after a sounding signal measurement between the DUs over an air interface in a first direction,
receiving reporting of the first DU-to-DU cross-link interference (CLI) measurement corresponding to the first direction, and after a sounding signal measurement between the DUs over an air interface in a second direction opposite to the first direction,
receiving reporting of the second DU-to-DU cross-link interference (CLI) measurement corresponding to the second direction,
wherein the method further comprises:
after receiving the reportings concerning measurements in the first direction from both a DU among the at least two separate distributed units (DU) tand another DU among the at least two separate distributed units (DU), receiving reporting of the measurement from an integrated access and backhaul nodes element (IAB) of the another DU via an extended F1 interface.

9. The method according to claim 8, wherein the sounding signal is a channel state information reference signal (CSI-RS).

10. The method according to claim 8, wherein the sounding signal is a known data packet on determined Physical Resource Blocks (PRBs) with determined Modulation and Coding Scheme (MCS).

11. The method according to claim 8, wherein beamforming is applied so that different sounding signals concerning different, at least two, beams are transmitted by a DU among the at least two separate distributed units (DU) simultaneously in different frequency ranges, correspondingly.

12. The method according to claim 8, wherein beamforming is applied so that different sounding signals concerning different, at least two, beams are transmitted by a DU among the at least two separate distributed units (DU) consecutively within the same frequency range.

13. The method according to claim 8, wherein the method further comprises:
after receiving the reporting s concerning measurements in the second direction from both a DU among the at least two separate distributed units (DU) and another DU among the at least two separate distributed units (DU), receiving reporting of the measurement from an integrated access and backhaul nodes element (IAB) of the DU among the at least two separate distributed units (DU) via the extended F1 interface.

14. The method according to claim 8, wherein the method further comprises:
if a received measurement indicate a DU-to-DU cross-link interference problem, performing a corrective action by sending a new radio frame configuration to the involved DUs.

15. A computer program product having a series of operating instructions stored on a non-transitory computer-readable medium that directs a data processing apparatus when executed thereby to perform operations, the operations comprising:
configuring a distributed unit sounding signaling transmission object and a distributed unit cross-link measurement object to at least two separate distributed units (DU) in succession, and after a sounding signal measurement between the DUs over an air interface in a first direction,
receiving reporting of the first DU-to-DU cross-link interference (CLI) measurement corresponding to the first direction, and after a sounding signal measurement between the DUs over an air interface in a second direction opposite to the first direction,
receiving reporting of the second DU-to-DU cross-link interference (CLI) measurement corresponding to the second direction,
wherein the operations further include:
after receiving the reportings concerning measurements in the first direction from both a DU among the at least two separate distributed units (DU) and another DU among the at least two separate distributed units (DU), receiving reporting of the measurement from an integrated access and backhaul nodes element (IAB) of the another DU among the at least two separate distributed units (DU) via an extended F1 interface.

16. The computer program product according to claim 15, wherein the operations further include:
after receiving the reporting s concerning measurements in the second direction from both a DU among the at least two separate distributed units (DU) and another DU among the at least two separate distributed units (DU), receiving reporting of the measurement from an integrated access and backhaul nodes element (IAB) of the DU among the at least two separate distributed units (DU) via the extended F1 interface.

17. The computer program product according to claim 15, wherein the operations further include:
if a received measurement indicate a DU-to-DU cross-link interference problem, performing a corrective action by sending a new radio frame configuration to the involved DUs.

* * * * *